G. McKITTRICK & P. B. HUMPHREY.
MAGNETIC EDUCATIONAL APPLIANCE.
APPLICATION FILED MAY 14, 1912.
1,168,949.
Patented Jan. 18, 1916.
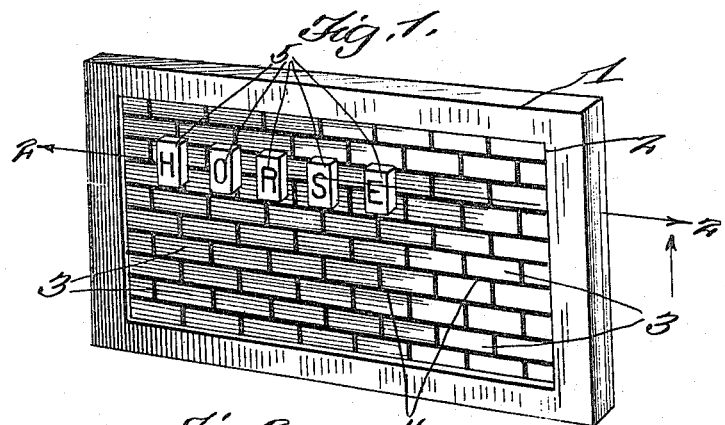
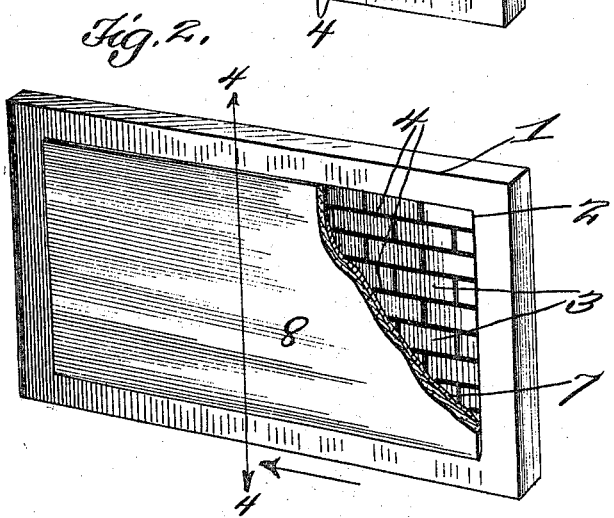
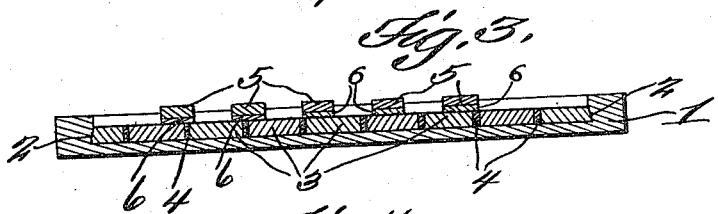
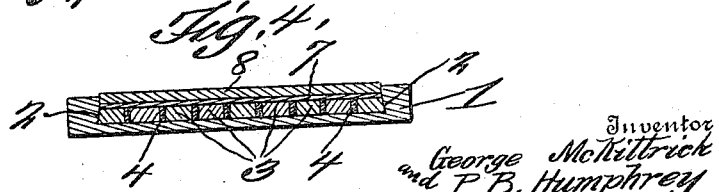

UNITED STATES PATENT OFFICE.

GEORGE McKITTRICK AND PIUS B. HUMPHREY, OF CANEY, KANSAS.

MAGNETIC EDUCATIONAL APPLIANCE.

1,168,949. Specification of Letters Patent. Patented Jan. 18, 1916.

Application filed May 14, 1912. Serial No. 697,330.

*To all whom it may concern:*

Be it known that we, GEORGE McKITTRICK and PIUS B. HUMPHREY, citizens of the United States, residing at Caney, in the county of Montgomery and State of Kansas, have invented a new and useful Magnetic Educational Appliance; and we do hereby declare the following to be a full, clear, and exact description of the invention, such as will enable others skilled in the art to which it appertains to make and use the same.

This invention relates to a new and useful device having magnetic means whereby an area of slate or a series of blocks having words, or letters, or pictures, etc. thereon may be held in position, adapted for educational purposes.

The principal object of the invention is to provide a contrivance of this nature to be used in connection with teaching primary pupils, especially in word and sentence building, and for teaching larger pupils geographic work and the like. Furthermore, such a contrivance may be used conveniently in restaurants, churches, homes and the like, for instance when used in a restaurant, the bill-of-fare, or specialties of the bill-of-fare may be indicated thereon, and when used in churches the nature of the sermon with subtopics may be indicated.

A feature of this invention is the provision of a frame for holding a series of permanent magnets, so arranged as to produce a substantially unobstructed surface and having a magnetic field, so that an area of slate backed with a conductor of soft iron or similar material, or images, blocks or the like having letters, or words or pictures and the like thereon also backed with conductors may be held in position by the magnetic force. The blocks may be in the contour of townships, counties and States and the like, so as to teach map building thereby. This contrivance may be constructed in any desired shape or of any dimensions.

The invention comprises further features and combination of parts, as hereinafter set forth, shown in the drawings, and claimed.

In the drawings:—Figure 1 is a view in perspective of the improved educational appliance constructed in accordance with the invention. Fig. 2 is a similar view showing an area of slate held in position, showing a part broken away to disclose several of the permanent magnets. Fig. 3 is a longitudinal sectional view. Fig. 4 is a transverse sectional view.

Referring to the drawings 1 designates the frame or plate or the like provided with a recess or depression 2 to receive a series of permanent magnets 3, suitably separated by any suitable means such as by liquid slate or fiber 4, so as to produce the proper magnetic field. It is to be observed that half of the marginal wall of the recess 2 of the frame is beveled to engage the corresponding beveled edge of the marginal oblong block permanent magnets. The other half of the marginal wall of said recess being straight or at right angles to the flat surface of the frame, thereby causing said marginal wall of the recess to overlie the marginal permanent magnet, to hold the magnet in place.

The blocks 5 on which words, numerals, pictures and the like are arranged, are provided with backings 6 of suitable conducting material, such as soft iron or the like, so that when the block is brought in contact with the surface constructed of the permanent magnet, the same will adhere in position. The design, picture, words, numerals or the like may be stamped directly upon the soft iron. A slate 8, however, is backed by suitable magnetic material 7, whereby it may be held in position by the permanent magnets.

From the foregoing it will be observed there has been devised an essential and novel educational appliance, which may not only be utilized as such, but may be adapted as a game board, and one which has been found desirable and practical.

The invention having been set forth, what is claimed as new and useful is:—

1. An educational appliance comprising a frame having a recess, a series of oblong shaped block magnets embedded in said recess, the marginal oblong block magnets having beveled edges, half of the marginal wall of the recess being correspondingly beveled to fit and engage the beveled edge of the marginal block magnets, the other half of the marginal wall of the recess being straight or at right angles to the flat surface of the frame, thereby causing the marginal wall of the recess to partially overlie the marginal block magnets to hold the magnets in place, said magnets being arranged to break joints in a brick like fashion, insulating material in said joints for holding the block magnets separated and insulated from one another.

2. An educational appliance comprising a frame having a recess, a series of block shaped magnets embedded in said recess, the marginal wall of the recess partially overlying the marginal magnets and acting to hold the magnets in place, said magnets being arranged to break joints in a brick-like effect, insulating material in said joints for holding the magnets separated and insulated from one another.

In testimony whereof we have signed our names to this specification in the presence of two subscribing witnesses.

GEORGE McKITTRICK.
PIUS B. HUMPHREY.

Witnesses:
J. E. STONE,
E. L. SHARPLESS.